June 8, 1965 W. E. GERBER 3,187,746
MOUTH EXERCISER
Filed May 4, 1962
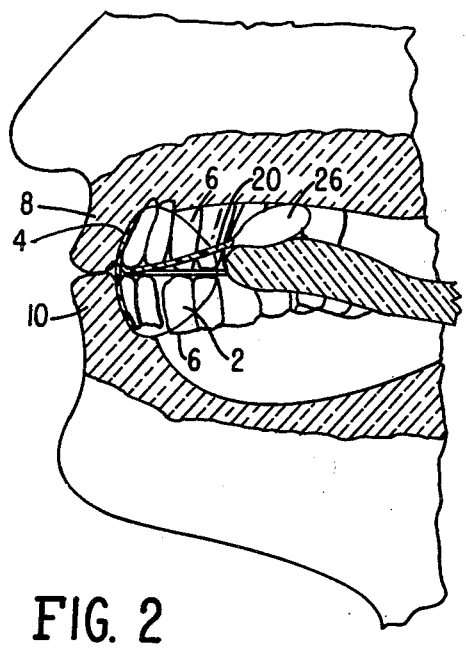
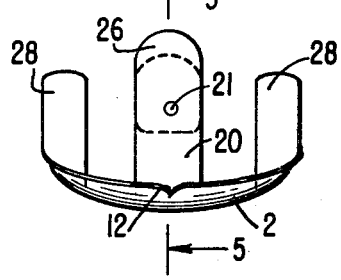
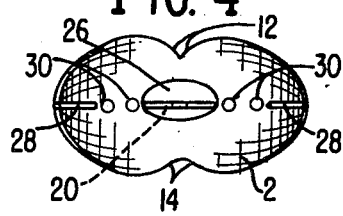
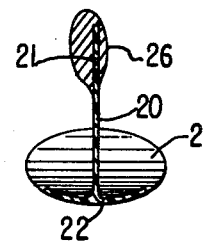
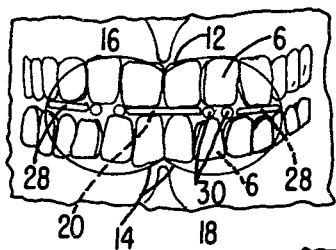
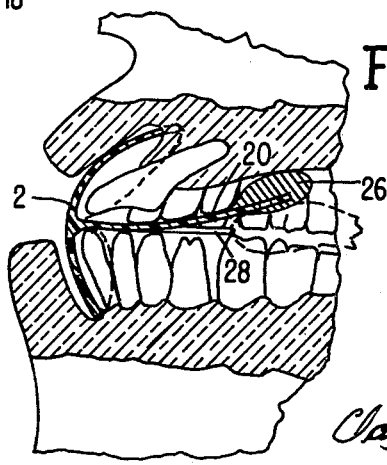
INVENTOR.
WARREN E. GERBER
BY
ATTYS.

United States Patent Office 3,187,746
Patented June 8, 1965

3,187,746
MOUTH EXERCISER
Warren E. Gerber, 64 Old Orchard Road, Skokie, Ill.
Filed May 4, 1962, Ser. No. 192,376
6 Claims. (Cl. 128—136)

This invention relates to an orthodontic mouth exerciser for juveniles in the age group from about three to fourteen years.

It has been found that orthodontic problems in juveniles are associated with the creation in infancy of reversed or deviated swallowing patterns which are evidenced by thrusting of the tongue forward during swallowing and by other improper use patterns developed during infancy. It is accordingly an object of this invention to provide mouth exercisers for juveniles within the age group of about three to fourteen years and which will correct for or eliminate the habitual improper use of the tongue and train the muscles used in swallowing so as to assume or develop a normal pattern of swallowing thereby eliminating those dental malocclusions and misalignments occasioned by the prior habitual improper use of the tongue.

A juvenile whose teeth have been properly aligned will all too often suffer a relapse in which the teeth return wholly or partially to their original deformed condition. It is believed that such relapses are largely caused by mouth breathing habits; by weak and flaccid orbicularis oris and buccinator muscles and by mouth muscle imbalance. It is accordingly a further object of the invention to provide means for correcting or eliminating mouth breathing in juveniles where not required by blocked nasal passages, and to strengthen those weak and flaccid lip and cheek muscles so that such relapse will not occur.

Juveniles, particularly in the younger ages, still frequently habitual sucking of the fingers and thumbs and of other external or foreign objects which create or worsen orthodontic problems and impede the orthodontist's work. It is accordingly a further object of the invention to provide orthodontic devices adapted to be wholly confined within the mouth and so designed that the prescribed use of a sufficient number over a period of time will correct or eliminate such sucking habits and eliminate the orthodontic problems created thereby.

The tone of investing tissues surrounding the teeth of today's juveniles is frequently poor, leading to pyorrhea, gum shrinkage, loose teeth and other dental problems in the older age groups and in young adults. It is accordingly a still further object of the invention to provide an orthodontic exercising device which will stimulate the circulation of blood through the gums, improve the tone of the investing tissues and increase the flow of saliva to counteract the conditions which tend to create such dental problems.

It has previously been suggested that the improper exercising of the mouth and jaw muscles during infancy might be minimized by the use of orthodontic nipples and pacifiers compelling proper use of the infant's mouth and jaw muscles. However, juveniles with orthodontic problems cannot be persuaded to use such nipples and pacifiers nor, in many cases, would such devices be effective for juveniles. It is, therefore, an important object of this invention to provide an orthodontic mouth exerciser which will commend itself to juveniles and which is designed to compel, by its use, proper exercising of the mouth and jaw muscles.

The above and other objects and advantages of this invention will be apparent from the following description when taken in connection with the accompanying drawing which:

FIGURE 1 is a view in elevation and partly in section illustrating the manner and use and placement of an orthodontic mouth exerciser constructed in accordance with the present invention;

FIGURE 2 is a fragmentary view in front elevation illustrating also the manner of use or placement of the device;

FIGURE 3 is a plan view of said device;

FIGURE 4 is a view in rear elevation of the device; and

FIGURE 5 is a view in vertical section taken along the line 5—5 of FIGURE 3.

FIGURE 6 is a view in elevation and partly in section illustrating the manner and use and placement of the device by a patient having an anterior open-bite.

Referring specifically to the drawing, a preferred form of an orthodontic mouth exerciser embodying the invention comprises a thin, oval, shield 2 preferably made of a thermo-plastic material such as a silicone rubber, and which is concave-convex in form, both vertically and horizontally, and proportioned, according to age classes, to occupy, at least vertically, substantially the entire vestibule area 4 between the patient's front teeth 6 and the patient's upper and lower lips 8 and 10 so that it may most comfortably to held in the mouth and the mouth will be necessarily fully, or substantially fully, closed when the shield is placed in the vestibule area. The plastic shield 2 is provided in its central, vertical plane with upper and lower rounded grooves 12 and 14 to receive the labia frenulum 16 and 18 uniting the upper and lower lips to the corresponding gums so that the patient's lips 8 and 10 may be comfortably retained in closed, or nearly closed, position during use while the shield 2 bears against the upper and lower front teeth and gums.

The device also includes a central plastic strip 20 formed integrally with the shield 2, or flexibly hinged thereto as at 22, and the strip 20 passes between the upper and lower teeth and into the moutth cavity with the mouth closed or substantially closed. The strip 20 when formed integrally with the shield 2 is made thin enough, or of such plastic material, as to posses sufficient flexibility to permit a pleasing vertical movement, resisted by the flexure resistance of strip 20, when pressed upon by the tongue 24.

A candy pellet 26, preferably sugarless, and of the slow dissolving type, is molded or otherwise formed on the outer free end of the strip 20, the strip having an opening 21 in its inner end to interlock with the pellet and thus secure it firmly in position. To insure the desired tongue action, the strip 20 is arranged to extend upwardly to approach the surface of the upper mandibular arch or roof of the mouth and the pellet is formed in tear-drop shape, as shown in FIGURES 1 and 4.

For malocclusions of the anterior open-bite type, the shield 2 is provided with bite-strips 28, preferably molded or formed integrally with the shield and on application of heat, bent to extend rearwardly from the side edges of the shield at the proper inclinations for gripping between the posterior upper and lower teeth, as shown most clearly in FIGURE 6. These bite-strips 28 may also, in many instances, provide a more comfortable means of retaining the shield in the mouth even though it would be possible for the patient to retain the shield by gripping the central strip 20, between the anterior upper and lower teeth.

In instances of gross malocclusions, as illustrated in FIGURE 6, the shield 2 may readily, on application of heat, be bent both vertically and horizontally, to conform to the various anterior-posterior deficiencies of the malocclusion so as to bear upon a desired number of the upper and lower front teeth and yet be comfortably received in the mouth vestibule.

For cases where normal breathing through the nose is prevented by blocked nasal passages, the shield 2 may be provided with perforations 30 forming air passages permitting mouth breathing the shield.

It is contemplated that the orthodontist may prescribe, or provide, a sufficient supply of these orthodontic devices for use, usually under his periodic supervision for a sufficient length of time to accomplish the desired purposes. The slow dissolving candy pellet 26 is preferably of such size as to provide an effective inducement to use a single device over a substantial period of time which is long enough to be of significant orthodontic value and effect but not so protracted as to induce the patient to set it aside before the pellet is dissolved.

A candy pellet of the shape described may be readily enveloped by the tongue and its shape and mouth position causes the patient to press the tongue upwardly toward the roof of the mouth cavity, against the flexure or yielding resistance of the strip, in order to "lick" or "suck" the confection pellet and to swallow. The rearward wiping action of the tongue over the free surface of the candy pellet applies an orthodontically desirable inward force to the shield 2 and through the shield 2 to the misaligned front teeth engaged by the shield. The joint exercise of the tongue muscles and the cheek and lip muscles required to "lick" or "suck" the slow dissolving confection and at the same time retain the device in the mouth (without external support) improves and strengthens all those muscles.

The thumb sucking desire of the younger age group of juveniles is satisfied by such use of the device but in a manner to reduce the orthodontic problems of those habitual thumb suckers and also avoid creation of the psychological problems so often created by the use of other methods of combatting the thumb sucking habits of the younger juveniles.

The device of this invention impels the user to breath through his nose, if possible, and the habitual or prescribed use of these devices accordingly eliminates the mouth breathing habit so harmful to the proper mouth muscalatures.

It will also be evident that the exercising of the orbicularis oris and buccinator muscles induced or impelled by the use of such devices as herein disclosed improves the strength of those muscles and brings the mouth muscles into proper, normal balance so that teeth which have been orthodontically aligned to not suffer a relapse to a deformed condition.

The beneficial effects of the "licking" or "sucking" of a slow dissolving confection, such as improved circulation, improved tone of investing tissues surrounding the teeth, and increased flow of saliva, will be secured by use of these devices without the orthodontically harmful effects of habitual sucking of objects supported externally of the mouth and with the mouth appreciably open or the lips significantly separated.

In some instances, initial difficulties may be experienced in adjusting to the full use of the device. In such cases, the strip 20 may be snipped or cut off, partially or wholly, to permit the patient to more easily adjust first to the use of the shield alone and thereafter to the full use of the device.

The details of the device disclosed herein are not to be taken as limitations upon the invention but as illustrations of a preferred embodiment in which variations may be made without departing from the invention as set forth in the attached claims.

What I claim is:

1. An orthodontic mouth exerciser for juveniles comprising a thin convex-concave plastic shield adapted to fit the mouth vestibule of the patient with the lips closed and to bear against the front teeth, a thin plastic strip extending rearwardly from the concave surface of the shield and adapted to pass between the front teeth of the patient and extend upwardly toward the roof of the mouth cavity, and a sugarless slow dissolving confection pellet on the read free end of the strip.

2. An orthodontic mouth exerciser as in claim 1 wherein the confection pellet is of tear-drop shape.

3. An orthodontic mouth exerciser as in claim 1 wherein laterally spaced bite strips extend rearwardly from the shield for gripping between the posterior upper and lower teeth.

4. An orthodontic mouth exerciser as in claim 1 wherein the shield is provided with perforations forming mouth breathing air passages.

5. An orthodontic mouth exerciser as in claim 1 wherein the shield is made of a thermo-plastic deformable on application of heat to conform the shield to the maloccluded form of the upper and lower front teeth.

6. An orthodontic mouth exerciser for juveniles comprising a shield having a concave rear surface for engaging the front teeth and gums of a patient when placed in the mouth vestibule and a front surface shaped to fit the lips when the lips are closed over the shield, said shield being formed with rounded grooves centrally of the upper and lower margins of the shield for receiving the labia frenulum and bite means extending rearwardly from the shield for gripping between the posterior upper and lower teeth, said exerciser also comprising a strip extending rearwardly from the shield and upwardly toward the roof of the mouth cavity and a slow dissolving confection pellet secured to the inner free end of the strip within the mouth cavity.

References Cited by the Examiner

UNITED STATES PATENTS

| 2,669,988 | 2/54 | Carpenter | 128—136 |
| 2,826,201 | 3/58 | Yoder | 128—359 |

FOREIGN PATENTS

| 3155/31 | 5/32 | Australia. |
| 112,200 | 1/18 | Great Britain. |
| 566,742 | 1/45 | Great Britain. |
| 927,769 | 5/47 | France. |
| 315,459 | 9/56 | Switzerland. |

OTHER REFERENCES

American Journal of Orthodontics, vol. 47, No. 8, August 1961 (folded advertisement insert both sides, after page 22 in advertisement section).

RICHARD A. GAUDET, *Primary Examiner.*

ROBERT E. MORGAN, *Examiner.*

UNITED STATES PATENT OFFICE
CERTIFICATE OF CORRECTION

Patent No. 3,187,746                                        June 8, 1965

Warren E. Gerber

It is hereby certified that error appears in the above numbered patent requiring correction and that the said Letters Patent should read as corrected below.

Column 1, line 36, before "habitual" insert -- evidence --; line 70, after "drawing" insert -- in --; column 2, line 9, for "invertical" read -- in vertical --; line 23, for "to" read -- be --; line 36, for "moutth" read -- mouth --; same column 2, line 39, for "posses" read -- possess --; column 3, line 3, after "breathing" insert -- through --; line 17, for "flexture" read -- flexure --; line 46, for "to" read -- do --; column 4, line 14 for "read" read -- rear --.

Signed and sealed this 26th day of October 1965.

(SEAL)
Attest:

ERNEST W. SWIDER                                               EDWARD J. BRENNER
Attesting Officer                                                      Commissioner of Patents